United States Patent
Masuda

(10) Patent No.: US 12,100,551 B2
(45) Date of Patent: Sep. 24, 2024

(54) CERAMIC ELECTRONIC DEVICE

(71) Applicant: TAIYO YUDEN CO., LTD., Tokyo (JP)

(72) Inventor: Hidetoshi Masuda, Takasaki (JP)

(73) Assignee: TAIYO YUDEN CO., LTD, Tokyo (JP)

(*) Notice: Subject to any disclaimer, the term of this patent is extended or adjusted under 35 U.S.C. 154(b) by 203 days.

(21) Appl. No.: 17/944,567

(22) Filed: Sep. 14, 2022

(65) Prior Publication Data

US 2023/0128407 A1    Apr. 27, 2023

(30) Foreign Application Priority Data

Oct. 25, 2021    (JP) .................................. 2021-173947

(51) Int. Cl.
*H01G 4/008* (2006.01)
*H01G 4/12* (2006.01)
*H01G 4/30* (2006.01)

(52) U.S. Cl.
CPC ........... *H01G 4/008* (2013.01); *H01G 4/1227* (2013.01); *H01G 4/30* (2013.01)

(58) Field of Classification Search
CPC ........ H01G 4/008; H01G 4/12; H01G 4/1227; H01G 4/30
See application file for complete search history.

(56) References Cited

U.S. PATENT DOCUMENTS

| | | | |
|---|---|---|---|
| 9,328,026 B2* | 5/2016 | Okajima | H01G 4/30 |
| 2007/0223177 A1 | 9/2007 | Ito et al. | |
| 2008/0304204 A1* | 12/2008 | Suzuki | H01G 4/30 361/321.3 |
| 2017/0345567 A1* | 11/2017 | Sakate | H01G 4/1218 |
| 2018/0261389 A1* | 9/2018 | Sakate | H01G 4/232 |
| 2019/0027311 A1* | 1/2019 | Chigira | H01G 4/1227 |
| 2022/0076891 A1* | 3/2022 | Han | H01G 4/1227 |
| 2022/0319775 A1* | 10/2022 | Kato | H01G 4/12 |

FOREIGN PATENT DOCUMENTS

JP    2007258646 A    10/2007

* cited by examiner

*Primary Examiner* — Nathan Milakovich
(74) *Attorney, Agent, or Firm* — Law Office of Katsuhiro Arai

(57) ABSTRACT

A ceramic electronic device includes a multilayer body in which each of a plurality of dielectric layers and each of a plurality of internal electrode layers are alternately stacked. In at least a part of a cover layer and side margins, a concentration of a specific metal of at least one of Ag, As, Au, Bi, Co, Cr, Cu, Fe, Ge, In, Ir, Mo, Os, Pd, Pt, Re, Rh, Ru, Se, Sn, Te, W or Zn is lower on an outer side than on a side of the multilayer body.

19 Claims, 9 Drawing Sheets

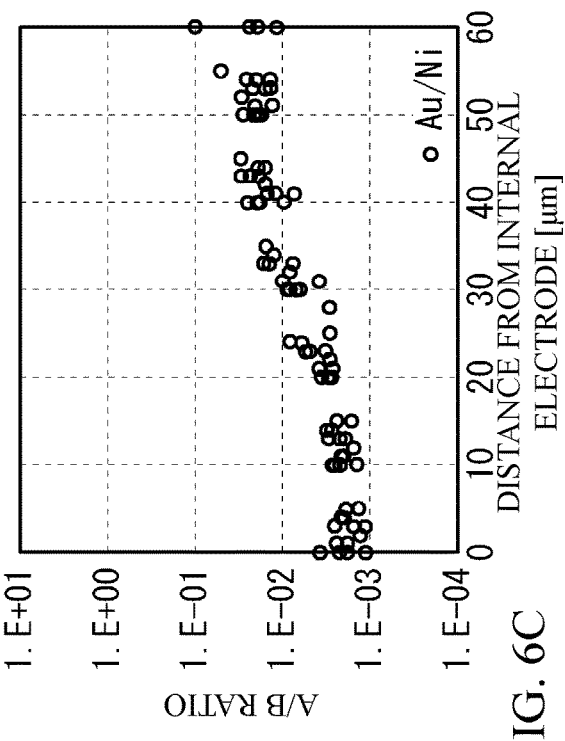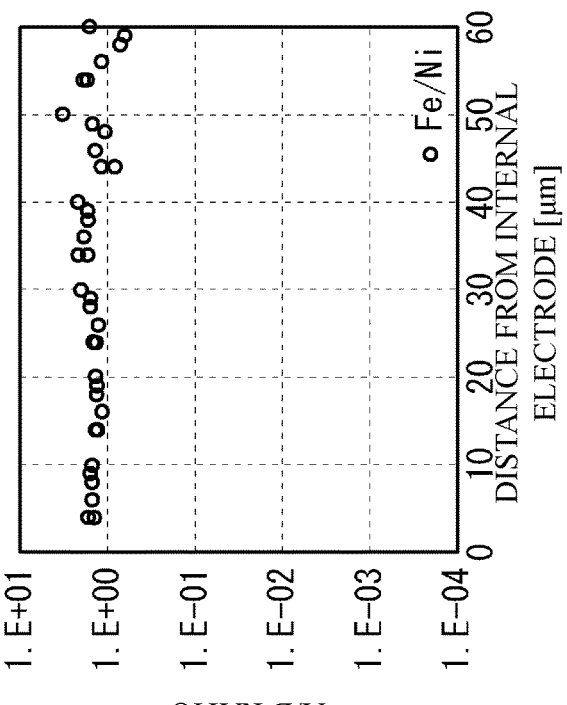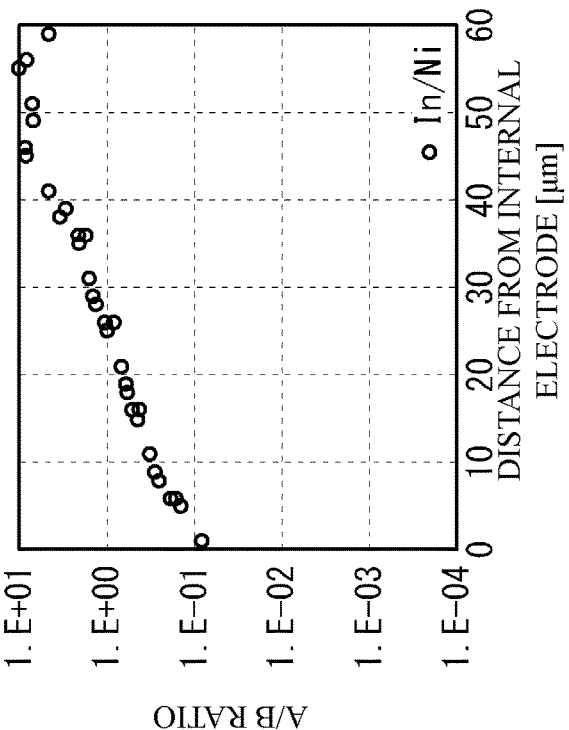
FIG. 6A  FIG. 6B  FIG. 6C  FIG. 6D

CERAMIC ELECTRONIC DEVICE

CROSS-REFERENCE TO RELATED APPLICATION

This application is based upon and claims the benefit of priority of the prior Japanese Patent Application No. 2021-173947, filed on Oct. 25, 2021, the entire contents of which are incorporated herein by reference.

FIELD

A certain aspect of the present invention relates to a ceramic electronic device.

BACKGROUND

With miniaturization of electronic apparatuses, further miniaturization of ceramic electronic devices such as multilayer ceramic capacitors mounted on electronic apparatuses is required. In order to increase a capacity, which is a basic characteristic, it is effective to thin cover layers and side margins (hereinafter referred to as an outer peripheral layer) that do not contribute to the capacity. On the other hand, the outer peripheral layer also has a function of isolating a capacity section from external environment. For example, if moisture in the atmosphere comes into direct contact with the capacity section, the insulating property of the capacitor deteriorates, leading to failure. In order to efficiently prevent the infiltration of water from the external environment in the thin outer peripheral layer, it is necessary to keep the outer peripheral layer in a dense state without cracks or pores and to eliminate moisture paths.

SUMMARY OF THE INVENTION

According to an aspect of the present invention, there is provided a ceramic electronic device including: a multilayer body in which each of a plurality of dielectric layers of which a main component is a ceramic having a perovskite structure and each of a plurality of internal electrode layers including Ni as a main component are alternately stacked, the multilayer body having a rectangular parallelepiped shape, each of the plurality of internal electrode layers being exposed to two end faces opposite to each other; and a cover layer which is provided at at least one of an upper face or a lower face of the multilayer body in a stacking direction, a main component of the cover layer being a ceramic having a perovskite structure, wherein the multilayer body has side margins covering edge portions to which the plurality of internal electrode layers extend toward two side faces other than the two end faces, a main component of the side margins being a ceramic, and wherein in at least a part of the cover layer and the side margins, a concentration of a specific metal of at least one of Ag, As, Au, Bi, Co, Cr, Cu, Fe, Ge, In, Ir, Mo, Os, Pd, Pt, Re, Rh, Ru, Se, Sn, Te, W or Zn is lower on an outer side than on a side of the multilayer body.

BRIEF DESCRIPTION OF THE DRAWINGS

FIG. 6A to FIG. 6D illustrate a molar concentration A/a molar concentration B of a specific metal in an outer peripheral layer;

DETAILED DESCRIPTION

It is difficult to uniformly densify the outer peripheral layer. For example, when a main component metal of internal electrode layers diffuse into the outer peripheral layer due to the influence of heat during a firing process, an amount of diffusion differs between the section near the internal electrode layers and the section outside the outer peripheral layer, so that distribution occurs in the sintered state within the outer peripheral layer.

A description will be given of an embodiment with reference to the accompanying drawings.

First Embodiment

Figure 1:
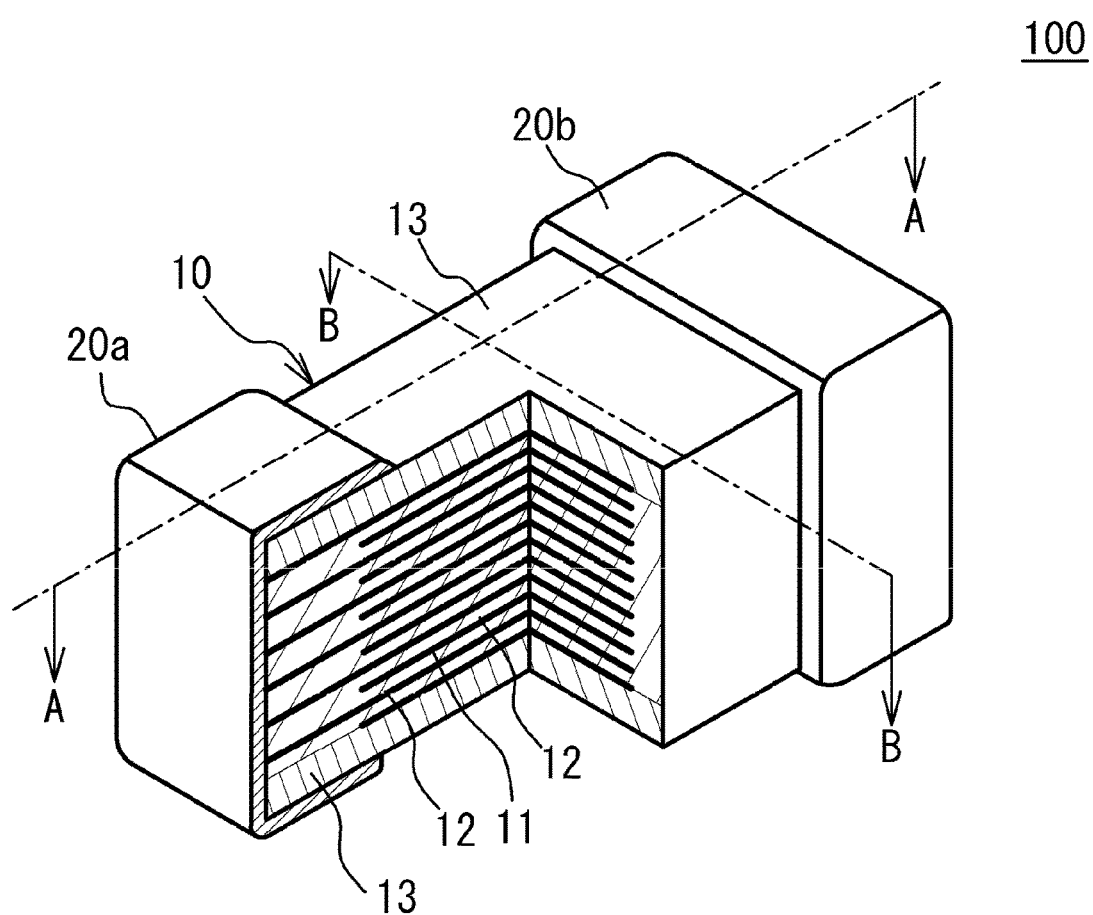
FIG. 1 illustrates a perspective view of a multilayer ceramic capacitor in which a cross section of a part of the multilayer ceramic capacitor is illustrated.
Figure 2:
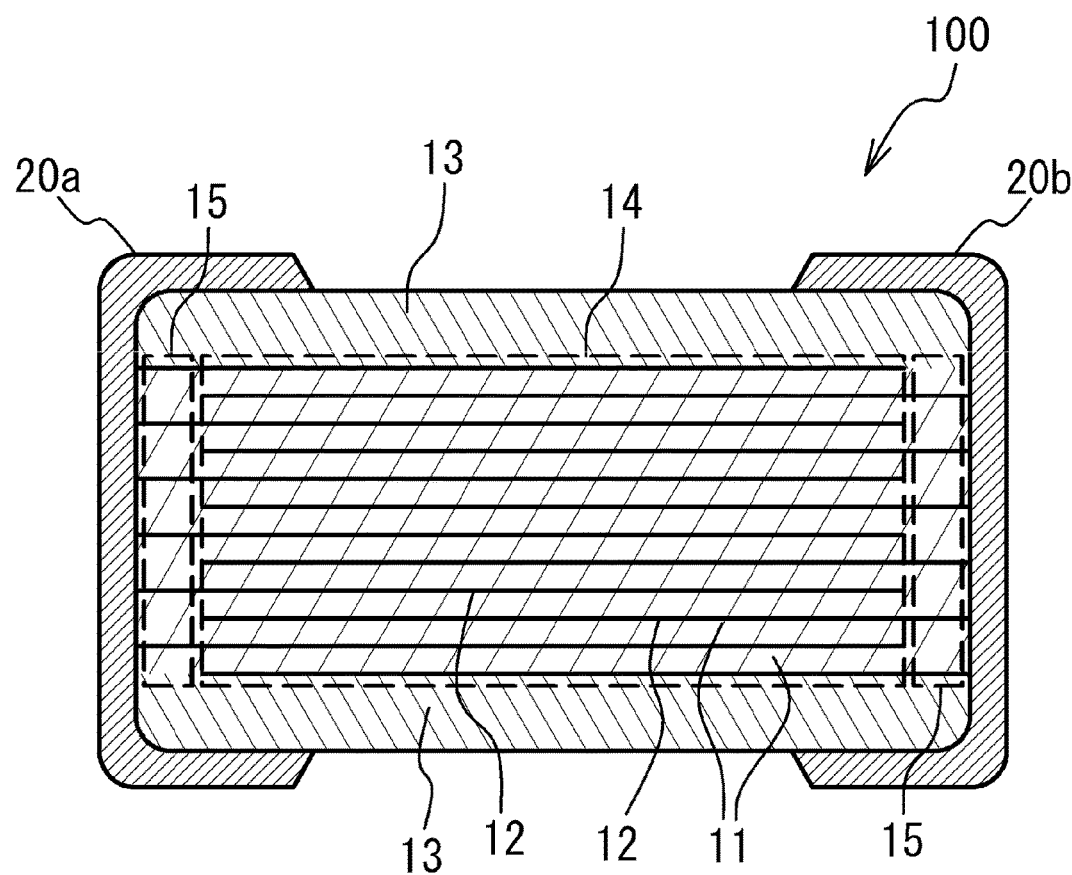
FIG. 2 illustrates a cross sectional view taken along a line A-A of FIG. 1.
Figure 3:
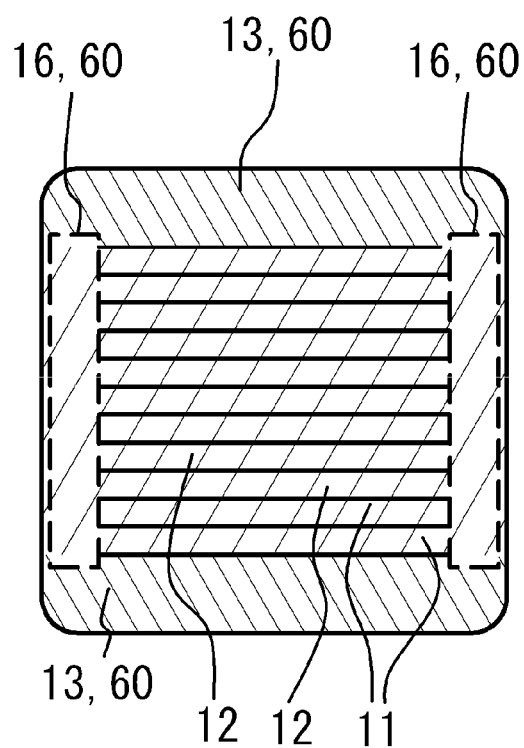
FIG. 3 illustrates a cross sectional view taken along a line B-B of FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of the dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 0.6 mm, a width of 0.3 mm, and a height of 0.110 mm. The multilayer ceramic capacitor 100 may have a length of 1.0 mm, a width of 0.5 mm, and a height of 0.5 mm. The multilayer ceramic capacitor 100 may have a length of 1.0 mm, a width of 0.5 mm, and a height of 0.1 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

A main component of the dielectric layer 11 is a ceramic material having a perovskite structure expressed by a general formula $ABO_3$. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. $Ba_{1-x-y}Ca_xSr_yTi_{1-z}Zr_zO_3$ may be barium strontium titanate, barium calcium titanate, barium zirconate, barium titanate zirconate, calcium titanate zirconate, barium calcium titanate zirconate or the like.

In the present embodiment, for example, the thickness of the dielectric layer 11 per layer is 0.05 μm or more and 5 μm or less, or 0.1 μm or more and 3 μm or less, or 0.2 μm or more and 1 μm or less. The thickness of the dielectric layer 11 is measured by observing the cross section of the multilayer ceramic capacitor 100 with an SEM (scanning electron microscope) and measuring the thickness of each of 10 different layers of the dielectric layer 11 by 10 points, and the average value of all the measurement points.

The internal electrode layer 12 contains Ni as a main component. The thickness of the internal electrode layer 12 is, for example, 10 nm or more and 1000 nm or less, 20 nm or more and 500 nm or less, and 50 nm or more and 300 nm or less. The thickness of the internal electrode layer 12 is measured by observing the cross section of the multilayer ceramic capacitor 100 with SEM, measuring the thickness of each of the 10 different internal electrode layers 12 by 10 points, and deriving the average value of all the measurement points.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity.

Since the cover layers 13 and the side margins 16 cover the outer periphery of the capacity section 14, the cover layers 13 and the side margins 16 are collectively referred to as an outer peripheral layer 60 below.

If moisture or the like in the atmosphere comes into direct contact with the capacity section 14, the insulating property of the multilayer ceramic capacitor 100 may deteriorate and cause a failure. By providing the outer peripheral layer 60, the capacity section 14 is isolated from the external environment, and insulation is obtained. On the other hand, in order to reduce the size and capacity of the multilayer ceramic capacitor 100, it is effective to make the outer peripheral layer 60, which does not contribute to the capacity, thin. Therefore, in order to efficiently prevent the infiltration of water from the external environment in the thin outer peripheral layer 60, it is required to keep the outer peripheral layer 60 in a dense state without cracks or pores and to eliminate the moisture paths.

Each part in the multilayer chip 10 is obtained by sintering a powder material by firing. In the capacity section 14, sintering is accelerated even in the dielectric layer 11 due to the influence of the Ni powder for forming the internal electrode layer 12. On the other hand, since the outer peripheral layer 60 does not have a portion corresponding to the internal electrode layer 12, sintering is slower than that of the capacity section 14. As a result, the outer peripheral layer 60 may have a large number of pores. Further, when Ni, which is the main component metal of the internal electrode layer 12, diffuses into the outer peripheral layer 60 due to the influence of heat during firing, there is a difference between an amount of Ni diffusing in a section close to the internal electrode layer 12 and an amount of Ni diffusing in a section outside the outer peripheral layer 60. Therefore, distribution may occur in the sintered state in the outer peripheral layer 60.

Figure 4:
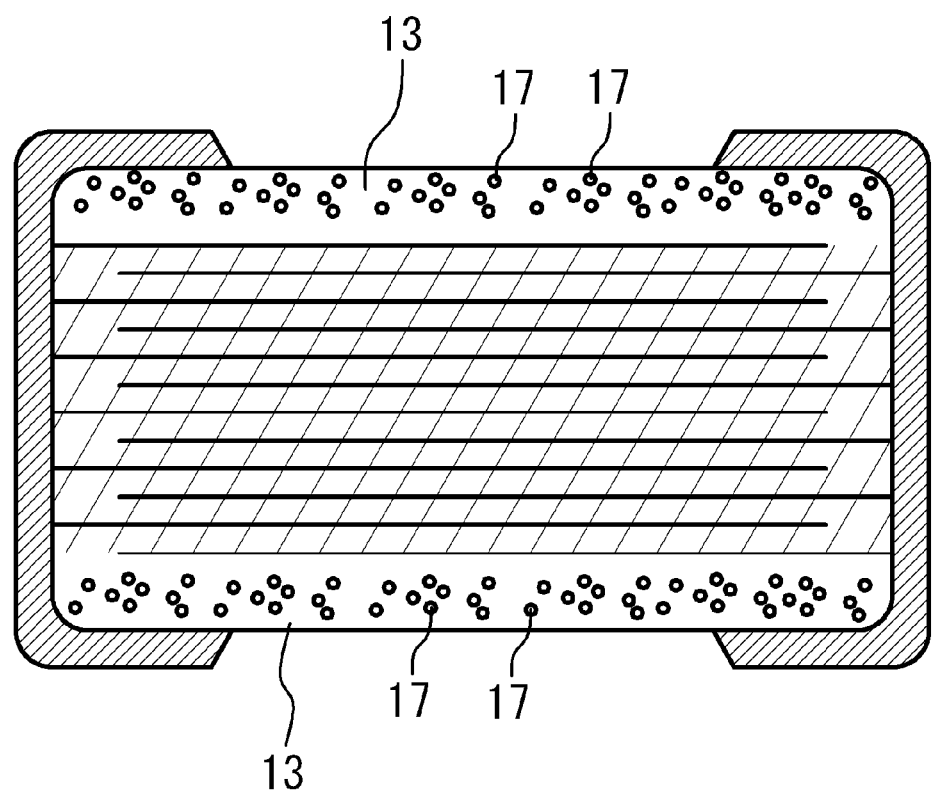
FIG. 4 is a diagram illustrating a case where a pore is formed in a cover layer.

FIG. 4 is a diagram illustrating the case where the pore 17 is formed in the cover layer 13. In FIG. 4, the hatch of the cover layer 13 is omitted. In the example of FIG. 4, a plurality of pores 17 are dispersed and formed in the cover layer 13. If the pores 17 are formed in the cover layer 13 in this way, sufficient insulating properties may not be necessarily obtained. Further, there are few pores on the side close to the capacity section 14 and many pores on the outside, and there is a possibility that distribution may occur in the sintered state in the outer peripheral layer 60. If the firing temperature is raised, the sintering of the outer peripheral layer 60 can be sufficiently advanced. However, if the firing temperature is raised, oversintering may occur in the internal electrode layer 12. In this case, the continuity modulus of the internal electrode layer 12 decreases, and the capacity characteristics may deteriorate.

Therefore, in the present embodiment, at least a part of the outer peripheral layer 60 has a configuration that can be uniformly densified while suppressing a decrease in the continuity modulus of the internal electrode layer 12. Specifically, at least a part of the outer peripheral layer 60 contains a specific metal in addition to the main component ceramic having a perovskite structure. Specific metals include at least one or more of Ag, As, Au, Bi, Co, Cr, Cu, Fe, Ge, In, Ir, Mo, Os, Pd, Pt, Re, Rh, Ru, Se, Sn, Te, W, and Zn. When these specific metals are contained in the outer peripheral layer 60, the outer peripheral layer 60 is sintered faster at the time of firing. Thereby, the formation of the pore 17 in the outer peripheral layer 60 can be suppressed. It is considered the fact that the outer peripheral layer 60 contains the specific metal accelerates the sintering of the outer peripheral layer 60 may be caused by at least one of a factor that the specific metal sinters faster than Ni and a factor that the specific metal exert the effect of accelerating the firing farther than Ni.

Further, in at least a part of the outer peripheral layer 60, a concentration gradient is formed such that the concentration of the specific metal gradually decreases from the capacity section 14 side to the outer peripheral (surface) side. With this configuration, sintering proceeds from the side close to the capacity section 14 to the outside, so that components from the inside (organic components such as binder) can be efficiently removed before the outside is densified and closed. As a result, the formation of the pores 17 is suppressed in the outer peripheral layer 60, and the outer peripheral layer 60 can be uniformly densified. As a result, the moisture resistance reliability of the multilayer ceramic capacitor 100 is improved.

FIG. 5A to FIG. 5D illustrate concentration distribution of the specific metal when Ni is used as the main component metal for the internal electrode layer 12, barium titanate is used as the main component ceramic for the dielectric layer 11 and the outer peripheral layer 60, and concentration distribution of the specific metal is formed in the outer peripheral layer 60 when a concentration gradient of the specific metal is formed. The concentration of the specific metal at each measurement point can be measured using LA-ICP (laser ablation inductively coupled plasma mass spectrometry). The interval between measurement points is, for example, 1000 nm. The thickness of the outer peripheral layer 60 is set to 60 μm as an example. In order to reduce noise, it may be averaged and smoothed at a plurality of adjacent points (for example, 9 points).

In FIG. 5A to FIG. 5D, the horizontal axis represents the distance from the internal electrode layer 12 (distance from the capacity section 14) in the outer peripheral layer 60, and the vertical axis represents a logarithm of a molar concentration A (at %) of the specific metal when the B-site element of the main component ceramic (Ti in barium titanate) is 100 at %. The distance from the internal electrode layer 12 represents the distance from the capacity section 14 in the stacking direction in the cover layer 13, and the distance from the capacity section 14 in the width direction of the internal electrode layer 12 in the side margin 16.

Figure 5B:
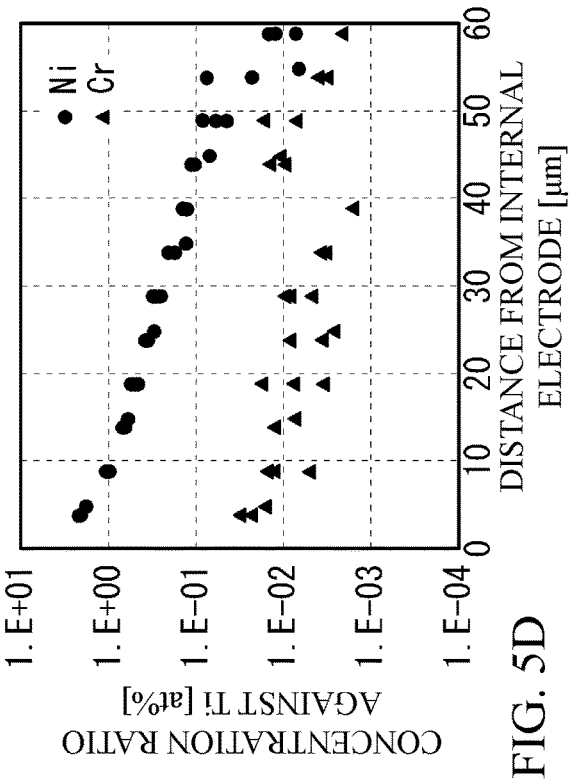
FIG. 5A to FIG. 5D illustrate concentration distribution of a specific metal.
Figure 5D:
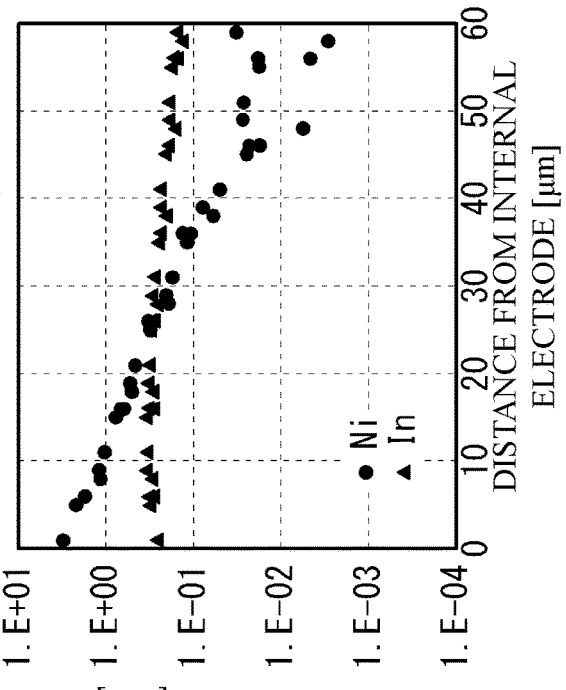
Figure 5A:
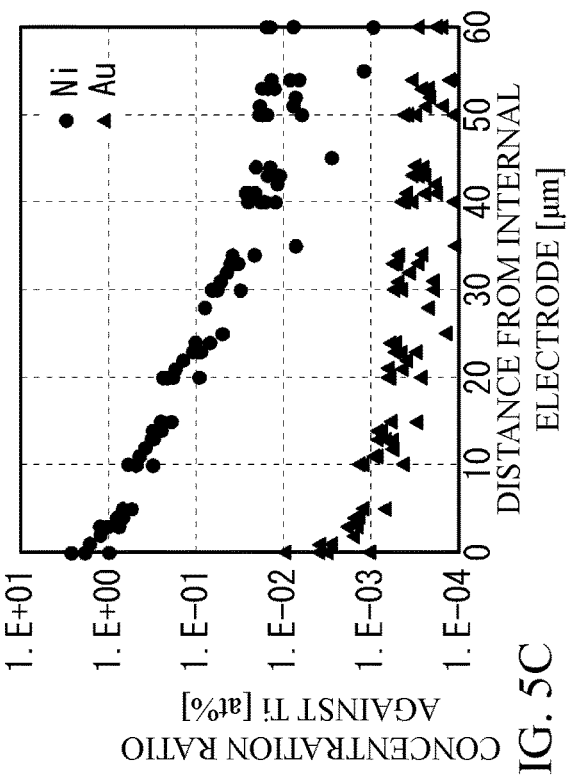
Figure 5C:
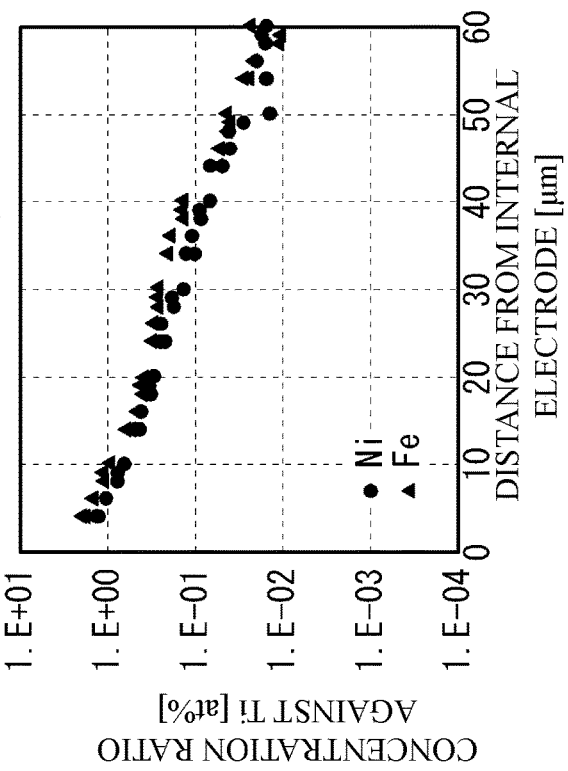

In FIG. 5A, Au is used as the specific metal. In FIG. 5B, Cr is used as the specific metal. In FIG. 5C, Fe is used as the specific metal. In FIG. 5D, In is used as the specific metal.

As illustrated in FIG. 5A to FIG. 5D, the molar concentration A of the specific metal has a minor decrease gradient such that the molar concentration A gradually decreases as the distance from the capacity section 14 increases. By forming such a concentration gradient for the specific metal, the outer peripheral layer 60 can be uniformly densified. The term "gradual decrease" as used herein includes a continuous decrease, and when the concentration is measured at a plurality of sample points from the capacity section 14 toward the outside, the concentration decreases as a whole while repeating up and down.

In any of FIG. 5A to FIG. 5D, the concentration distribution of Ni is also plotted. As illustrated in FIG. 5A to FIG. 5D, the molar concentration B of Ni has a minor decrease gradient such that the molar concentration B gradually decreases as the distance from the capacity section 14 increases. The reason why Ni is contained in the outer peripheral layer 60 is that Ni is diffused from the internal electrode layer 12 in the process of firing. Here, too, "gradual decrease" includes continuous decrease, and when the concentration is measured at a plurality of sample points from the capacity section 14 toward the outside, the decrease as a whole is repeated up and down. include.

FIG. 6A to FIG. 6D illustrate the molar concentration A/molar concentration B (hereinafter, A/B ratio) of the specific metal in the outer peripheral layer 60. The horizontal axis represents the distance from the internal electrode layer 12 (distance from the capacity section 14) in the outer peripheral layer 60. And the vertical axis represents the A/B ratio logarithmically. The A/B ratio is the ratio of the molar concentration A and the molar concentration B at the same measurement point. As illustrated in FIG. 6A, when Au is used as the specific metal, the A/B ratio has a monotonous increase gradient such that the A/B ratio gradually increases as the distance from the capacity section 14 increases. As illustrated in FIG. 6B, when Cr is used as the specific metal, the A/B ratio has a monotonous increase gradient such that the A/B ratio gradually increases as the distance from the capacity section 14 increases. As illustrated in FIG. 6C, when Fe is used as the specific metal, the A/B ratio tends to maintain a predetermined range regardless of the distance from the capacity section 14 and there is no increase or decrease. As illustrated in FIG. 6D, when In is used as the specific metal, the A/B ratio has a monotonous increase gradient such that the A/B ratio gradually increases as the distance from the capacity section 14 increases.

Table 1 shows the results of FIG. 5A to FIG. 5D and FIG. 6A to FIG. 6D. Table 1 shows the lower limit (at %), upper limit (at %), and shape of the concentration gradient of the molar concentration A of the specific metal in the outer peripheral layer 60. Table includes the lower limit (at %), upper limit, and the shape of the concentration gradient of the molar concentration B of Ni in the outer peripheral layer 60. Table 1 includes the lower limit, upper limit and the shape of the gradient of the A/B ratio in the outer peripheral layer 60. It is thought that Bi, Ir, Os, Pd, Pt, Rh, and Ru exhibit the same behavior as Au because the balance point between the ease of sintering with respect to the outer peripheral layer 60 and the ease of diffusion into the outer peripheral layer 60 is close. Ag and Cu are considered to exhibit the same behavior as Cr because the balance between the ease of sintering with respect to the outer peripheral layer 60 and the ease of diffusion into the outer peripheral layer 60 are close to each other. Ge, Sn, and Co are considered to exhibit the same behavior as Fe because the balance points between the ease of sintering with respect to the outer peripheral layer 60 and the ease of diffusion into the outer peripheral layer 60 are close to each other. As, Mo, Re, Se, Te, W, and Zn exhibit the same behavior as In because the balance between the ease of sintering with respect to the outer peripheral layer 60 and the ease of diffusion into the outer peripheral layer 60 are close to each other.

TABLE 1

|  | Au | Cr | Fe | In |
|---|---|---|---|---|
| LOWER LIMIT OF MOLAR CONCENTRATION A (at %) | 0.00001 | 0.0001 | 0.001 | 0.01 |
| UPPER LIMIT OF MOLAR CONCENTRATION A (at %) | 0.1 | 1 | 20 | 5 |
| SHAPE | MONOTONIC DECREASE | MONOTONIC DECREASE | MONOTONIC DECREASE | MONOTONIC DECREASE |
| LOWER LIMIT OF MOLAR CONCENTRATION B (at %) | 0.0001 | 0.0001 | 0.0001 | 0.0001 |
| UPPER LIMIT OF MOLAR CONCENTRATION B (at %) | 20 | 20 | 20 | 20 |
| SHAPE | MONOTONIC DECREASE | MONOTONIC DECREASE | MONOTONIC DECREASE | MONOTONIC DECREASE |
| LOWER LIMIT OF A/B RATIO | 0.0001 | 0.0005 | 0.05 | 0.01 |
| UPPER LIMIT OF A/B RATIO | 1 | 5 | 50 | 100 |
| SHAPE | MONOTONIC INCREASE | MONOTONIC INCREASE | WITHOUT INCREASE OR DECREASE | MONOTONIC INCREASE |
| SIMILAR ELEMENT | Bi, Ir, Os, Pd, Pt, Rh, Ru | Ag, Cu | Ge, Sn, Co | As, Mo, Re, Se, Te, W, Zn |

When the molar concentration A of the specific metal in the outer peripheral layer 60 is too low, the sintering of the outer peripheral layer 60 may not be sufficiently accelerated. Therefore, it is preferable to set a lower limit for the molar concentration A of the specific metal in the outer peripheral layer 60. For example, when the specific metal is at least one of Au, Bi, Ir, Os, Pd, Pt, Rh, and Ru, the molar concentration A of the specific metal in the outer peripheral layer 60 is preferably 0.00001 at % or more. The molar concentration A is more preferably 0.00005 at % or more, and even more preferably 0.0001 at % or more. For example, when the specific metal is at least one of Cr, Ag, and Cu, the molar concentration A of the specific metal in the outer peripheral layer 60 is preferably 0.0001 at % or more, more preferably 0.0005 at % or more, and even more preferably 0.001 at % or more. For example, when the specific metal is at least one of Fe, Ge, Sn, and Co, the molar concentration A of the specific metal in the outer peripheral layer 60 is preferably 0.001 at % or more, more preferably 0.005 at %, and even more preferably 0.01 at % or more. For example, when the specific metal is at least one of In, As, Mo, Re, Se, Te, W, and Zn, the molar concentration A of the specific metal in the outer peripheral layer 60 is preferably 0.01 at % or more. The molar concentration A is more preferably 0.05 at % or more, even more preferably 0.1 at % or more.

When the molar concentration of the specific metal in the outer peripheral layer 60 is too high, the insulating property may be deteriorated. Therefore, it is preferable to set an upper limit on the molar concentration of the specific metal in the outer peripheral layer 60. For example, when the specific metal is at least one of Au, Bi, Ir, Os, Pd, Pt, Rh, and Ru, the molar concentration A of the specific metal in the outer peripheral layer 60 is preferably 0.1 at % or less, more preferably 0.05 at % or less, even more preferably 0.01 at % or less. For example, when the specific metal is at least one of Cr, Ag, and Cu, the molar concentration A of the specific metal in the outer peripheral layer 60 is preferably 1 at % or less, more preferably 0.5 at % or less, and even more preferably 0.1 at % or less. For example, when the specific metal is at least one of Fe, Ge, Sn, and Co, the molar concentration A of the specific metal in the outer peripheral layer 60 is preferably 20 at % or less, more preferably 10 at % or less, and even more preferably 2 at % or less. For example, when the specific metal is at least one of In, As, Mo, Re, Se, Te, W, and Zn, the molar concentration A of the specific metal in the outer peripheral layer 60 may be preferably 5 at % or less, more preferably 1 at % or less, and even more preferably 0.5 at % or less.

In order to form a sufficient gradient in the molar concentration A of the specific metal in the outer peripheral layer 60, it is preferable to set a lower limit in the ratio of the upper limit/lower limit of the molar concentration A in the outer peripheral layer 60. For example, the ratio of the upper limit/lower limit of the molar concentration A in the outer peripheral layer 60 is preferably 1 or more, more preferably 1.2 or more, and even more preferably 1.5 or more. On the other hand, when the gradient provided in the molar concentration A of the specific metal in the outer peripheral layer 60 is too large, the outermost peripheral sintering may not be necessarily in time. Therefore, it is preferable to set an upper limit on the ratio of the upper limit/lower limit of the molar concentration A in the outer peripheral layer 60. For example, the ratio of the upper limit/lower limit of the molar concentration A in the outer peripheral layer 60 is preferably 100,000 or less, more preferably 50,000 or less, and even more preferably 10,000 or less. In the outer peripheral layer 60, the molar concentration A gradually decreases from the capacity section 14 side toward the outside, so that the upper/lower limit ratio of the molar concentration A corresponds to a ratio of the molar concentration A closest to the capacity section 14 and the outermost molar concentration A in the outer peripheral layer 60.

When the A/B ratio is too low in the outer peripheral layer 60, sintering may not proceed sufficiently. Therefore, it is preferable to set a lower limit for the A/B ratio in the outer peripheral layer 60. For example, when the specific metal is at least one of Au, Bi, Ir, Os, Pd, Pt, Rh, and Ru, the A/B ratio in the outer peripheral layer 60 is preferably 0.001 or more, more preferably 0.0005 or more, and even more preferably 0.001 or more. For example, when the specific metal is at least one of Cr, Ag, and Cu, the A/B ratio in the outer peripheral layer 60 is preferably 0.0005 or more, more preferably 0.001 or more and even more preferably 0.005 or more. For example, when the specific metal is at least one of Fe, Ge, Sn, and Co, the A/B ratio in the outer peripheral layer 60 is preferably 0.05 or more, more preferably 0.1 or more and even more preferably 0.5 or more. For example, when the specific metal is at least one of In, As, Mo, Re, Se, Te, W, and Zn, the A/B ratio in the outer peripheral layer 60 is preferably 0.01 or more, more preferably 0.05 or more, and even more preferably 0.1 or more.

When the A/B ratio is too high in the outer peripheral layer 60, the insulating property may be deteriorated. Therefore, it is preferable to set an upper limit on the A/B ratio in the outer peripheral layer 60. For example, when the specific metal is at least one of Au, Bi, Ir, Os, Pd, Pt, Rh, and Ru, the A/B ratio in the outer peripheral layer 60 is preferably 1 or less, more preferably 0.5 or less, and even more preferably 0.1 or less. For example, when the specific metal is at least one of Cr, Ag, and Cu, the A/B ratio in the outer peripheral layer 60 is preferably 5 or less, more preferably 1 or less, and even more preferably 0.5 or less. For example, when the specific metal is at least one of Fe, Ge, Sn, and Co, the A/B ratio in the outer peripheral layer 60 is preferably 50 or less, more preferably 10 or less, and even more preferably 5 or less. For example, when the specific metal is at least one of In, As, Mo, Re, Se, Te, W, and Zn, the A/B ratio in the outer peripheral layer 60 is preferably 100 or less, more preferably 50 or less, and even more preferably less 10 or less.

When the outer peripheral layer 60 is too thin, there is a possibility that the intrusion of moisture in the external environment cannot be sufficiently suppressed. Therefore, it is preferable to set a lower limit for the thickness of the outer peripheral layer 60. For example, the thickness of the outer peripheral layer 60 is preferably 10 μm or more, more preferably 15 μm or more, and even more preferably 20 μm or more. On the other hand, when the outer peripheral layer 60 is too thick, the section where the capacity is not generated becomes large. Therefore, it is preferable to set an upper limit on the thickness of the outer peripheral layer 60. For example, the thickness of the outer peripheral layer 60 is preferably 50 μm or less, more preferably 45 μm or less, and even more preferably 40 μm or less. The thickness of the outer peripheral layer 60 is the thickness of the cover layer 13 in the stacking direction, and the thickness of the side margin 16 is the thickness in the width direction of the internal electrode layer 12. The thickness of the cover layer 13 and the side margin 16 can be measured by observing the cross section of the multilayer ceramic capacitor 100 with an SEM (scanning electron microscope), and calculating an average of the thicknesses of 10 different points measured for each of the cover layer 13 and the side margin 16.

Note that the molar concentration A of the specific metal is the total value of the molar concentrations of the plurality of metals when there are a plurality of metal types.

Figure 7:
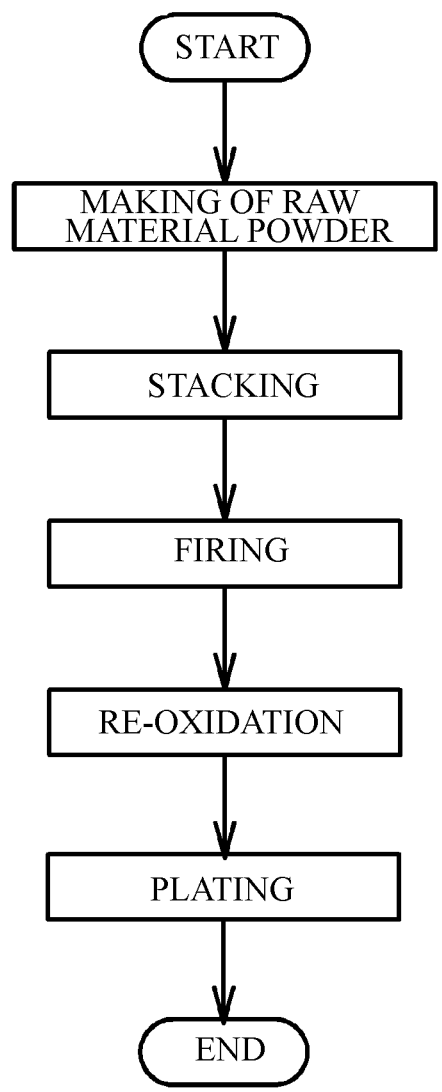
FIG. 7 illustrates a manufacturing method of a multilayer ceramic capacitor.

Next, a description will be given of a manufacturing method of the multilayer ceramic capacitors 100. FIG. 7 illustrates a manufacturing method of the multilayer ceramic capacitor 100.

Making Process of Raw Material Powder

A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting ceramic powder, in accordance with purposes. The additive compound may be an oxide of Mg, Mn (manganese), V (vanadium), Cr or a rare earth element (Y, Sm (samarium), Eu (europium), Gd (gadolinium), Tb (terbium), Dy (dysprosium), Ho (holmium), Er (erbium), Tm (thulium) and Yb (ytterbium)), or an oxide of Co, Ni, Li (lithium), B (boron), Na (sodium), K (potassium) and Si (silicon). The additive compound may be a glass including cobalt, nickel, lithium, boron, sodium, potassium or silicon.

For example, the resulting ceramic raw material powder is wet-blended with additives and is dried and crushed. Thus, a ceramic material is obtained. For example, the particle diameter may be adjusted by crushing the resulting ceramic material as needed. Alternatively, the grain diameter of the resulting ceramic power may be adjusted by combining the crushing and classifying. With the processes, a dielectric material is obtained.

Stacking Process

Next, a binder such as polyvinyl butyral (PVB) resin, an organic solvent such as ethanol or toluene, and a plasticizer are added to the resulting dielectric material and wet-blended. With use of the resulting slurry, a dielectric green sheet 52 is painted on a base material 51 by, for example, a die coater method or a doctor blade method, and then dried. The base material 51 is, for example, PET (polyethylene terephthalate) film.

Figure 8A:
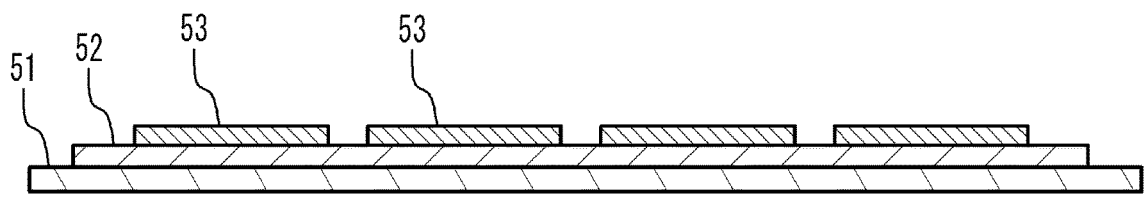
FIG. 8A and FIG. 8B illustrate a stacking process.

Next, as illustrated in FIG. 8A, an internal electrode pattern 53 is formed on the dielectric green sheet 52. In FIG. 8A, as an example, four parts of the internal electrode pattern 53 are formed on the dielectric green sheet 52 and are spaced from each other. The dielectric green sheet 52 on which the internal electrode pattern 53 is formed is a stack unit.

Figure 8B:
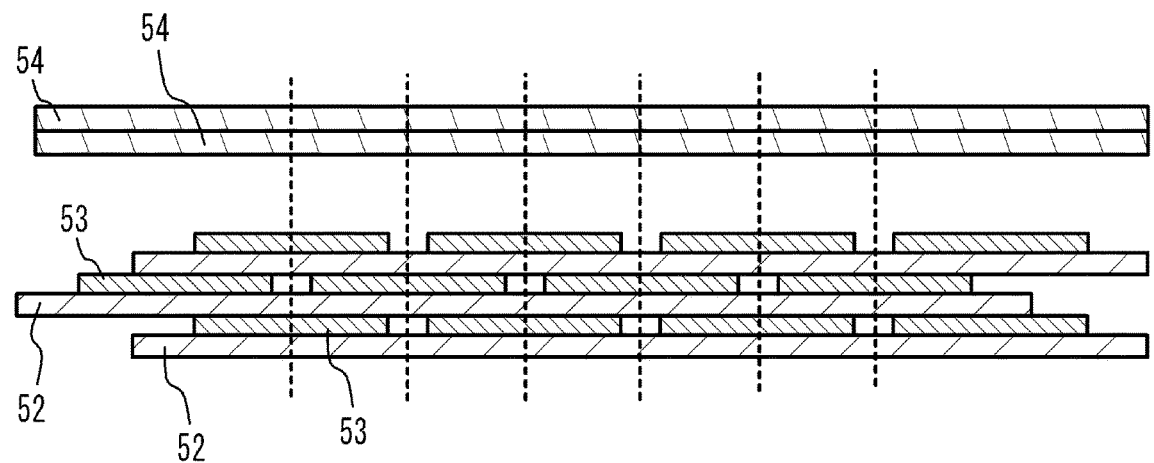

Next, the dielectric green sheets 52 are peeled from the base materials 51. As illustrated in FIG. 8, the stack units are stacked.

A predetermined number of a cover sheet 54 is stacked on an upper face and a lower face of a ceramic multilayer structure of the stacked stack units and is thermally crimped. The resulting ceramic multilayer structure is cut into a chip having a predetermined size (for example, 1.0 mm×0.5 mm). In FIG. 8, the multilayer structure is cut along a dotted line. The cover sheet 54 can be obtained by wet-blending the raw material made in the raw material making process, with a binder such as polyvinyl butyral (PVB) resin, an organic solvent such as ethanol or toluene, and a plasticizer, and painting the resulting slurry on the base material 51 by, for example, a die coater method or a doctor blade method, and then drying the slurry.

Each cover sheet 54 has at least one of the specific metals of Ag, As, Au, Bi, Co, Cr, Cu, Fe, Ge, In, Ir, Mo, Os, Pd, Pt, Re, Rh, Ru, Se, Sn, Te, W and Zn. At that time, the amount of the specific metal added to each cover sheet 54 is different from each other. For the cover sheet 54 closest to the multilayer body of the stack units, the concentration of the specific metal is set to the highest, and the concentration of the specific metal is gradually lowered as the distance from the multilayer body of the stack units increases. In this manner, it is possible to form a gradient in the concentration of the specific metal.

Figure 9:
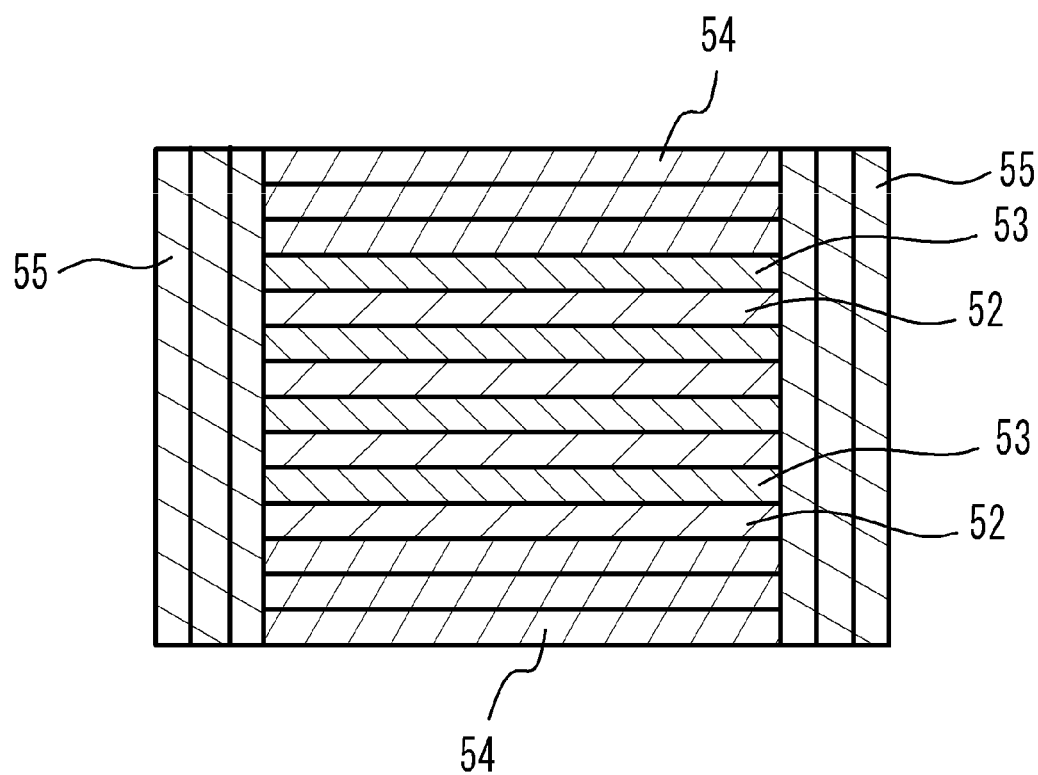
FIG. 9 illustrates a stacking process.

The region corresponding to the side margin 16 may be attached or applied to the side surface of the multilayer body of the stack units. Specifically, as illustrated in FIG. 9, the dielectric green sheet 52 and the internal electrode pattern 53 having the same width as the dielectric green sheet 52 are alternately stacked to obtain a multilayer body. Next, a plurality of side margin sheets 55 may be attached to the side surface of the multilayer body. Similar to the dielectric green sheet 52, the side margin sheet 55 can be obtained by wet-blending the raw material made in the raw material making process, with a binder such as polyvinyl butyral (PVB) resin, an organic solvent such as ethanol or toluene, and a plasticizer, and painting the resulting slurry on the base material 51 by, for example, a die coater method or a doctor blade method, and then drying the slurry.

The specific metal is added to each of the side margin sheets 55. The amount of the specific metal added to each of the side margin sheets 55 is different from each other. For the side margin sheet 55 closest to the multilayer body of the stack units, the concentration of the specific metal is set to the highest, and the concentration of the specific metal is gradually lowered as the distance from the multilayer body of the stack units increases. In this manner, it is possible to form a gradient in the concentration of the specific metal.

Firing Process

The binder is removed from the ceramic multilayer structure in $N_2$ atmosphere. A metal paste to be the base layer of the external electrodes 20a and 20b is applied to the both end faces of the ceramic multilayer structure by a dipping method. The resulting ceramic multilayer structure is fired for 10 minutes to 2 hours in a reductive atmosphere having an oxygen partial pressure of 10-5 to 10-8 atm in a temperature range of 1100 degrees C. to 1300 degrees C.

Re-oxidizing Process

After that, a re-oxidizing process may be performed in $N_2$ gas atmosphere in a temperature range of 600 degrees C. to 1000 degrees C.

Plating Process

After that, by a plating process, plated layers of Cu, Ni, Sn or the like may be formed on the external electrodes 20a and 20b.

According to the method for manufacturing the multilayer ceramic capacitor 100 according to the present embodiment, the concentration gradient in which the concentration of the specific metal in the cover layer 13 gradually decreases from the capacity section 14 side to the outer periphery (surface) by making the concentration of the specific metal of each cover sheet 54 different from each other. Further, by making the concentration of the specific metal of each side margin sheet 55 different from each other, the concentration gradient is formed in the side margin 16 so that the concentration of the specific metal gradually decreases from the capacity section 14 side to the outer peripheral (surface) side.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

Hereinafter, the multilayer ceramic capacitor according to the embodiment was manufactured and its characteristics were investigated.

Comparative Example 1

A dielectric green sheet containing barium titanate as the main component of the ceramic component was prepared, and Ni paste was printed on the surface of the dielectric green sheet as the internal electrode pattern. 13 numbers of the dielectric green sheets on which the internal electrode pattern was formed were stacked on a cover sheet prepared in advance. No specific metal was added to the cover sheet. Subsequently, crimping, cutting, application of a metal paste for an external electrode, and firing were performed to obtain the multilayer ceramic capacitor.

Example 1

Ten cover sheets having a thickness of 1/10 of the predetermined thickness were prepared, and different amounts of Fe were added to each cover sheet so as to have a desired inclined composition. These 10 cover sheets were stacked in order. In the stacking, each cover sheet was stacked so that the amount of Fe added to the cover sheet closest to the internal electrode was the largest and the amount of Fe added gradually decreased. The 10 stacked cover sheets were used as one cover sheet. Thirteen layers of the dielectric green sheets on which the internal electrode pattern was printed were stacked on the surface of the cover sheet. Other steps were the same as in Comparative Example 1.

Example 2

Ten cover sheets with a thickness of 1/10 of the predetermined thickness were prepared, and different amounts of Au were added to each sheet so as to have a desired inclined composition. These 10 sheets were stacked in order. In the stacking, each cover sheet was stacked so that the amount of Au added to the cover sheet closest to the internal electrode was the largest and the amount of Au added gradually decreased. The 10 stacked cover sheets were used as one cover sheet. Thirteen layers of the dielectric green sheets on which the internal electrode pattern was printed were stacked on the surface of the cover sheet. Other steps were the same as in Comparative Example 1.

Example 3

Ten cover sheets with a thickness of 1/10 of the predetermined thickness were prepared, and different amounts of Cr were added to each sheet so as to have a desired inclined composition. These 10 sheets were stacked in order. In the stacking, each cover sheet was stacked so that the amount of Cr added to the cover sheet closest to the internal electrode was the largest and the amount of Cr added gradually decreased. The 10 stacked cover sheets were used as one cover sheet. Thirteen layers of the dielectric green sheets on which the internal electrode pattern was printed were stacked on the surface of the cover sheet. Other steps were the same as in Comparative Example 1.

Example 4

Ten cover sheets with a thickness of 1/10 of the predetermined thickness were prepared, and different amounts of In were added to each sheet so as to have a desired inclined composition. These 10 sheets were stacked in order. In the stacking, each cover sheet was laminated so that the amount of In added to the cover sheet closest to the internal electrode was the largest and the amount of In added gradually decreased. The 10 stacked cover sheets were used as one cover sheet. Thirteen layers of the dielectric green sheets on which the internal electrode pattern was printed were stacked on the surface of the cover sheet. Other steps were the same as in Comparative Example 1.

Comparative Example 2

Ten cover sheets with a thickness of 1/10 of the predetermined thickness were prepared, and Fe was added in the same amount for each sheet so as not to have an inclined composition. These 10 sheets were laminated in order to form one cover sheet. Thirteen layers of the dielectric green sheets on which the internal electrode pattern was printed were stacked on the surface of the cover sheet. The amount of Fe added to each cover sheet was larger than that of Example 1. Other steps were the same as in Comparative Example 1.

Comparative Example 3

Ten cover sheets with a thickness of 1/10 of the predetermined thickness were prepared, and Cr with the same amount for each sheet was added so as not to have an inclined composition. These 10 sheets were stacked in order to form one cover sheet. Thirteen layers of the dielectric green sheets on which the internal electrode pattern was printed were stacked on the surface of the cover sheet. The amount of Cr added to each cover sheet was larger than that of Example 3. Other steps were the same as in Comparative Example 1.

For each of Examples 1 to 4 and Comparative Examples 2 and 3, the molar concentration A of the specific metal and the molar concentration B of Ni in the cover layer were measured using LA-ICP. The interval between measurement points was 1000 nm. In Comparative Example 1, since the specific metal was not added to the cover sheet, neither the molar concentration A nor the molar concentration B was measured. In both Examples 1 to 4 and Comparative Examples 2 and 3, the concentration of the specific metal gradually decreased in the cover layer as the distance from the capacity section increased.

In Example 1, the minimum value of the molar concentration A of the specific metal was 0.01 at %, the maximum value of the molar concentration A was 2 at %, the minimum value of the A/B ratio was 0.8, and the maximum value of the A/B ratio was 3. In Example 2, the minimum value of the molar concentration A of the specific metal was 0.0001 at %, the maximum value of the molar concentration A was 0.004 at %, and the minimum value of the A/B ratio was 0.001, and the maximum value of the A/B ratio was 0.1. In Example 3, the minimum value of the molar concentration A of the specific metal was 0.002 at %, the maximum value of the molar concentration A was 0.03 at %, the minimum value of the A/B ratio was 0.005, and the maximum value of the A/B ratio was 0.2. In Example 4, the minimum value of the molar concentration A of the specific metal was 0.2 at %, the maximum value of the molar concentration A was 0.3 at %, the minimum value of the A/B ratio was 0.1, and the maximum value of the A/B ratio was 10. In Comparative Example 2, the molar concentration A of the specific metal was 0.3 at % over the entire outer peripheral layer, the minimum value of the A/B ratio was 0.06, and the maximum value of the A/B ratio was 300. In Comparative Example 3, the molar concentration A of the specific metal was 0.2 at % over the entire outer peripheral layer, the minimum value of the A/B ratio was 0.04, and the maximum value of the A/B ratio was 200. . . . The results are shown in Table 2.

TABLE 2

| | SPECIFIC METAL | MINIMUM MOLAR CONCENTRATION A (at %) | MAXIMUM MOLAR CONCENTRATION A (at %) | MINIMUM A/B RATIO | MAXIMUM A/B RATIO | HUMIDITY RESISTANCE RELIABILITY | CAPACITY |
|---|---|---|---|---|---|---|---|
| COMPARATIVE EXAMPLE 1 | — | — | — | — | — | × | ○ |
| COMPARATIVE EXAMPLE 2 | Fe | 0.3 | 0.3 | 0.06 | 300 | × | ○ |
| COMPARATIVE EXAMPLE 3 | Cr | 0.2 | 0.2 | 0.04 | 200 | × | × |
| EXAMPLE 1 | Fe | 0.01 | 2 | 0.8 | 3 | ○ | ○ |
| EXAMPLE 2 | Au | 0.0001 | 0.004 | 0.001 | 0.1 | ○ | ○ |
| EXAMPLE 3 | Cr | 0.002 | 0.03 | 0.005 | 0.2 | ○ | ○ |
| EXAMPLE 4 | In | 0.2 | 0.3 | 0.1 | 10 | ○ | ○ |

Moisture resistance reliability was investigated for each of Examples 1 to 4 and Comparative Examples 1 to 3. Specifically, a moisture resistance load test was conducted. If the test time of 500 hours was cleared, it was judged that the moisture resistance reliability was good "○". If a failure occurs before finishing of the test time of 500 hours, it was judged that the moisture resistance reliability was poor "x". In any of Examples 1 to 4, it was judged that the moisture resistance reliability was good "○". It is considered that this was because the concentration of the specific metal was gradually decreased from the capacity section side to the outside in the outer peripheral layer. In Comparative Example 1, it was judged that the moisture resistance reliability was poor "x". It is considered that this was because the specific metal was not added to the outer peripheral layer.

The capacity characteristics were investigated for each of Examples 1 to 4 and Comparative Examples 1 to 3. Specifically, the capacity was measured using an LCR meter. If the design capacity was achieved, it was judged that the capacity characteristic was good "○". If the design capacity was not achieved, it was judged that the capacity characteristic was poor "x". In any of Examples 1 to 4, the capacity characteristics were judged to be good "○". It is considered that this was because the configurations in which the molar concentration A was in an appropriate range were obtained in Examples 1 to 4.

Although the embodiments of the present invention have been described in detail, it is to be understood that the various change, substitutions, and alterations could be made hereto without departing from the spirit and scope of the invention.

The invention claimed is:

1. A ceramic electronic device comprising:
a multilayer body in which each of a plurality of dielectric layers of which a main component is a ceramic having a perovskite structure and each of a plurality of internal electrode layers including Ni as a main component are alternately stacked, the multilayer body having a rectangular parallelepiped shape, each of the plurality of internal electrode layers being exposed to two end faces opposite to each other; and
a cover layer which is provided at at least one of an upper face or a lower face of the multilayer body in a stacking direction, a main component of the cover layer being a ceramic having a perovskite structure,
wherein the multilayer body has side margins covering edge portions to which the plurality of internal electrode layers extend toward two side faces other than the two end faces, a main component of the side margins being a ceramic, and
wherein in at least a part of the cover layer and the side margins, a concentration of a specific metal of at least one of Ag, As, Au, Bi, Co, Cr, Cu, Fe, Ge, In, Ir, Mo, Os, Pd, Pt, Re, Rh, Ru, Se, Sn, Te, W or Zn is lower on an outer side than on a side of the multilayer body.

2. The ceramic electronic device as claimed in claim 1, wherein the concentration of the specific metal gradually decreases from the side of the multilayer body to the outer side.

3. The ceramic electronic device as claimed in claim 1, wherein when the specific metal is at least one of Au, Bi, Ir, Os, Pd, Pt, Rh or Ru, the concentration of the specific metal in the part is 0.00001 at % or more and 0.1 at % or less on a presumption that an amount of a B site element of the main component in the part is 100 at %.

4. The ceramic electronic device as claimed in claim 1, wherein when the specific metal is at least one of Au, Bi, Ir, Os, Pd, Pt, Rh or Ru, a ratio of a molar concentration of the specific metal/a molar concentration of Ni at a same sample point in the part is 0.0001 or more and 1 or less.

5. The ceramic electronic device as claimed in claim 1, wherein when the specific metal is at least one of Cr, Ag or Cu, a concentration of the specific metal in the part is 0.0001 at % or more and 1 at % or less on a presumption that an amount of a B site element of the main component in the part is 100 at %.

6. The ceramic electronic device as claimed in claim 1, wherein when the specific metal is at least one of Cr, Ag or Cu, a ratio of a molar concentration of the specific metal/a molar concentration of Ni at a same sample point in the part is 0.0005 or more and 5 or less.

7. The ceramic electronic device as claimed in claim 1, wherein when the specific metal is at least one of Fe, Ge, Sn or Co, the concentration of the specific metal in the part is 0.001 at % or more and 20 at % or less on a presumption that an amount of a B site element of the main component in the part is 100 at %.

8. The ceramic electronic device as claimed in claim 1, wherein when the specific metal is at least one of Fe, Ge, Sn or Co, a ratio of a molar concentration of the specific metal/a molar concentration of Ni at a same sample point in the part is 0.05 or more and 50 or less.

9. The ceramic electronic device as claimed in claim 1, wherein when the specific metal is at least one of In, As, Mo, Re, Se, Te, W or Zn, a concentration of the specific metal is 0.01 at % or more and 5 at % or less on a presumption that an amount of a B site element of the main component in the part is 100 at %.

10. The ceramic electronic device as claimed in claim 1, wherein when the specific metal is at least one of In, As, Mo, Re, Se, Te, W or Zn, a ratio of a molar concentration of the specific metal/a molar concentration of Ni at a same sample point in the part is 0.01 or more and 100 or less.

11. The ceramic electronic device as claimed in claim 1, wherein a ratio of an upper limit/a lower limit of a molar concentration of the specific metal in the part is 1 or more and 100000 or less.

12. The ceramic electronic device as claimed in claim 1, wherein a thickness of the part is 10 μm or more and 50 μm or less.

13. The ceramic electronic device as claimed in claim 1, wherein the main component of the part is barium titanate.

14. The ceramic electronic device as claimed in claim 1, wherein when the specific metal is Fe, the concentration of the specific metal in the part is 0.01 at % or more and 2 at % or less on a presumption that an amount of a B site element of the main component in the part is 100 at %.

15. The ceramic electronic device as claimed in claim 1, wherein when the specific metal is Fe, a ratio of a molar concentration of the specific metal/a molar concentration of Ni at a same sample point in the part is 0.8 or more and 3 or less.

16. The ceramic electronic device as claimed in claim 1, wherein when the specific metal is Au, the concentration of the specific metal in the part is 0.0001 at % or more and 0.004 at % or less on a presumption that an amount of a B site element of the main component in the part is 100 at %.

17. The ceramic electronic device as claimed in claim 1, wherein when the specific metal is Au, a ratio of a molar concentration of the specific metal/a molar concentration of Ni at a same sample point in the part is 0.001 or more and 0.1 or less.

18. The ceramic electronic device as claimed in claim 1, wherein when the specific metal is Cr, a concentration of the specific metal in the part is 0.002 at % or more and 0.03 at % or less on a presumption that an amount of a B site element of the main component in the part is 100 at %.

19. The ceramic electronic device as claimed in claim 1, wherein when the specific metal is Cr, a ratio of a molar concentration of the specific metal/a molar concentration of Ni at a same sample point in the part is 0.005 or more and 0.2 or less.

* * * * *